United States Patent [19]

Smiedt

[11] Patent Number: 5,495,531
[45] Date of Patent: Feb. 27, 1996

[54] EQUIPMENT WHICH INCLUDED ELECTRONICS

[75] Inventor: Leslie Smiedt, Cape Town, South Africa

[73] Assignee: Son Holdings Limited of c/o Celtic Trust Company Limited, Tortola, Virgin Islands (Br.)

[21] Appl. No.: 400,186

[22] Filed: Mar. 6, 1995

Related U.S. Application Data

[63] Continuation of Ser. No. 95,398, Jul. 21, 1993, abandoned.

[30] Foreign Application Priority Data

Jul. 21, 1992 [ZA] South Africa .......................... 92/5482

[51] Int. Cl.$^6$ ........................................... H04L 9/00
[52] U.S. Cl. .................................. 380/4; 380/23; 340/468
[58] Field of Search ........................... 380/3, 4, 23, 25; 340/468

[56] References Cited

U.S. PATENT DOCUMENTS

| | | | |
|---|---|---|---|
| 4,757,533 | 7/1988 | Allen et al. ................................... | 380/4 |
| 4,864,494 | 9/1989 | Kobus, Jr. ................................. | 364/200 |
| 4,916,617 | 4/1990 | Norwood .................................. | 364/422 |
| 4,916,737 | 4/1990 | Chomet et al. ............................ | 380/20 |
| 5,105,179 | 4/1992 | Smith ....................................... | 340/468 |
| 5,222,135 | 6/1993 | Hardy et al. ................................. | 380/4 |
| 5,226,080 | 6/1993 | Cole et al. ................................. | 380/25 |
| 5,321,241 | 6/1994 | Craine ...................................... | 235/380 |

FOREIGN PATENT DOCUMENTS

| | | |
|---|---|---|
| 0191162 | 8/1986 | European Pat. Off. . |
| 0219577 | 4/1987 | European Pat. Off. . |
| 0388840 | 9/1990 | European Pat. Off. . |
| 0388843 | 9/1990 | European Pat. Off. . |
| 2601480 | 1/1988 | France . |
| 3313481 | 10/1984 | Germany . |
| 2176637 | 12/1986 | United Kingdom . |

OTHER PUBLICATIONS

Derwent Publns. Ltd. May 1992 "Secure Technique for Activating Feature Options . . . " 92–198882.
Derwent Publns. Ltd.—92–251175 Feb. 1992.

*Primary Examiner*—David C. Cain
*Attorney, Agent, or Firm*—Levisohn, Lerner, Berger & Langsam

[57] ABSTRACT

To enable control to be exercised over the use of equipment, a chip is built into the electronic circuitry of the equipment which chip has stored therein a series of pseudo-random numbers. When a crypto unit of the chip receives a first number generated by a controlling computer the pseudo-random number sequence is generated on the basis of an algorithm which is stored in the crypto unit of the chip. The first number is generated when data, including the serial number of the equipment, is entered into the controlling computer. The serial number of the equipment is entered in a read only memory of the chip so that the serial number of the equipment is a permanent and unalterable part of the electronic circuitry. Various uses to which equipment having its serial number entered in a chap thereof are also disclosed.

17 Claims, 1 Drawing Sheet

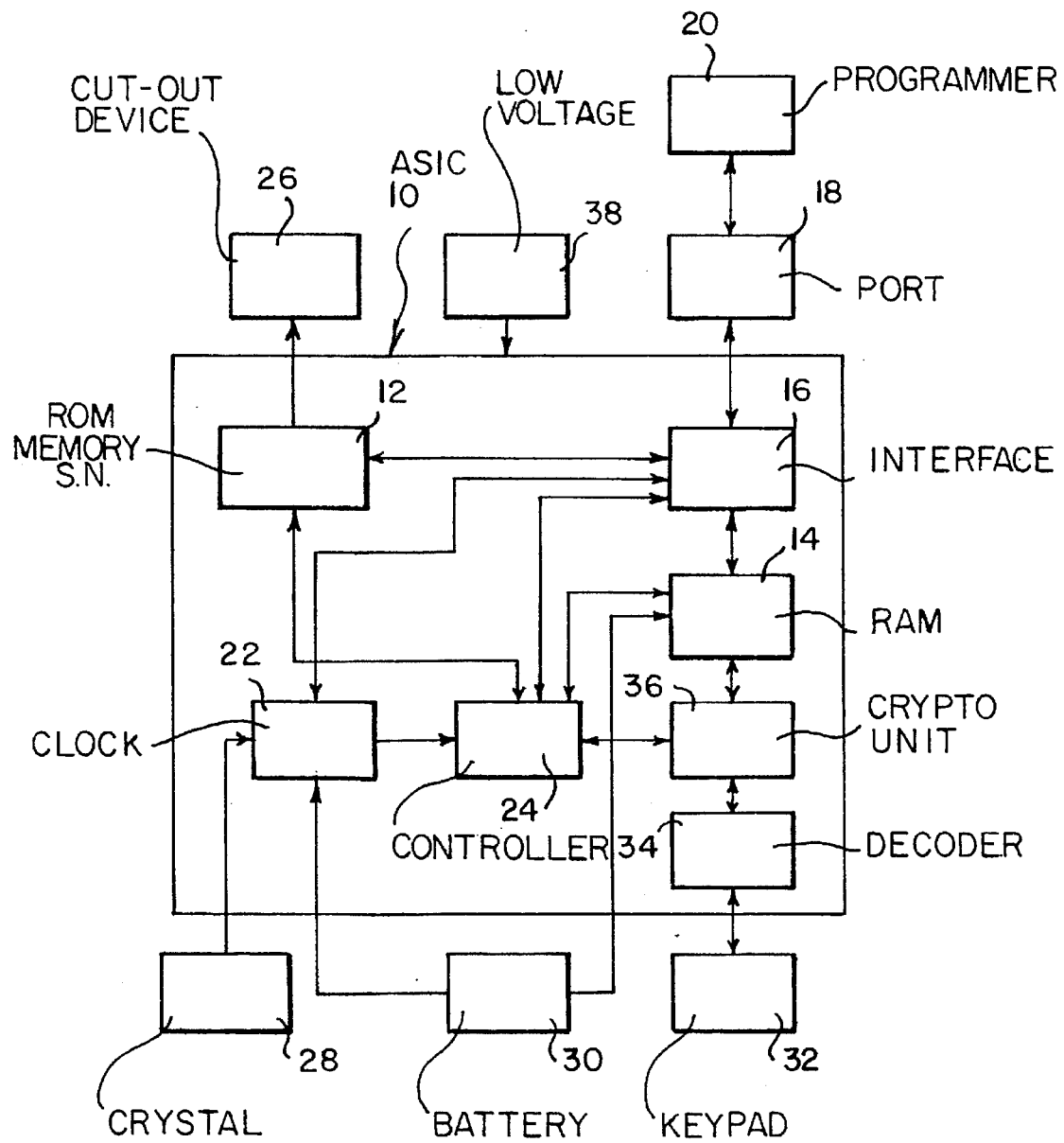

EQUIPMENT WHICH INCLUDED ELECTRONICS

This application is a continuation of application Ser. No. 08/095,398, filed Jul. 21, 1993, now abandoned.

BACKGROUND TO THE INVENTION

The bulk of consumer durables, eg domestic goods and motor vehicles, and also office equipment and factory equipment, are supplied on the basis of some form of deferred payment plan. The type of agreement varies from country to country but broadly stated the equipment may be rented to the user, may be supplied on lease, or may be sold in terms of an agreement which provides that payment shall be made in instalments over a period of time. The most important feature of all these agreements is that the purchaser or user of the goods undertakes to make regular payments. Often these are made to a bank or other financial institution rather than to the supplier.

It is common practice to allocate a serial number to almost all equipment which is supplied to domestic users, to offices and to factories. The purpose of the serial number is to enable that piece of equipment to be identified and, perhaps of more importance, to be distinguished from other equipment of the same type, which other equipment, apart from the serial number, is identical and hence indistinguishable.

The type of domestic goods involved are, by way of example, television sets, video recorders, microwave ovens, refrigerators, electric ovens, deepfreezes, dish washing machines, clothes washing machines and tumble dryers. Office machinery includes photocopiers, fax machines, printers, and computing equipment. Factor equipment includes looms, sewing machines, forklift trucks, printing presses etc. All these goods have in common the fact that they are electrically powered and incorporate an electronic control system.

It is obviously the intention of the manufacturer that the serial number of a piece of equipment should remain the same throughout its life. This is important when a service contract has been provided. It is not unknown for serial numbers to be moved from one piece of equipment to another, or for casings to be changed. The purpose of this can be, for example, to obtain service on equipment that is not covered by a service contract, or to obtain service on two or more pieces of equipment whilst paying for only one service contract.

Motor vehicles are supplied both to domestic users and to commerce and industry. These again are almost invariably supplied in terms of an agreement which provides for payment over a period of time. Clearly the prime source of power in a motor vehicle is not electrical but without its electronic system a modern motor vehicle cannot run.

In the event that the payment schedule is not maintained the bank or other financial institution must institute legal proceedings to retrieve the equipment. This can take a number of months even if the action is entirely undefended. The defaulting party then, without payment, has the use of the equipment for a number of months before it is repossessed.

In most agreements of this nature the piece of equipment is identified by its serial number. To the financial institution, therefore, the serial number is of paramount importance. The ability to change the serial number of a piece of equipment makes it possible to perpetrate many types of fraud. For example, if a serial number is moved from a new piece of equipment which is the subject of a financial agreement to an old piece, and it is the old equipment which is seized by the financial institution because payments are not made, then the institution has been defrauded. Most frauds of this type can be prevented if it is impossible to tamper with the serial number of the piece Of equipment.

Another area of technology where a serial number can assume considerable importance is that of security generally and access control of personnel in particular. Doors operated by coded cards are in everyday use. The reader fitted to the door checks the validity of the card by comparing the information on the card with the information which has been stored in the card reader. Only if the card carries the correct information will the door open. Many doors have their card readers attached after they have been installed and the readers can easily be removed and transferred to other doors. Advantages, as discussed hereinafter, arise where the access door is allocated a unique serial number and can therefore be distinguished electronically from all other doors of the same type.

Where equipment is the subject of a maintenance plan, it is important to the supplier of the equipment that the equipment receive whatever regular services are specified. If such services are carried out the risk of equipment breakdowns and resultant damage, which the supplier must repair at its cost, is minimised. The serial number of the equipment can, in accordance with the present invention, be used to force the user of the equipment to undertake regular servicing.

In summary, serial numbers play an important role in commerce and industry as evidenced by the fact that few, if any, pieces of equipment that include electronics, do not have a serial number.

OBJECTS OF THE INVENTION

The main object of the present invention is to provide a method of, and means for, allocating a unique serial number to a piece of equipment which serial number cannot be changed and which therefore uniquely identifies that piece of equipment.

A further object of the present invention is to provide a system which enables control to be exercised over operation of a piece of equipment which has been supplied on terms which include a series of payments over a period of time or which includes regular servicing provisions.

Another object of the present invention is to provide a system which enables a piece of equipment to be interrogated to determine whether it is covered by a warranty or other plan which provides for free repairs and maintenance.

A still further object of the present invention is to provide means that renders equipment inoperable in the event that the user of the equipment defaults on a payment.

Yet another object of the present invention is to provide a system which enables the supplier of a piece of equipment to force the user to carry out a specified maintenance program.

A yet further object of the present invention is to provide a piece of equipment which includes an identifying serial number that can be verified by interrogation means but which serial number cannot be read.

An additional object of the present invention is to provide a piece of equipment with a serial number and with the ability to identify itself when interrogated by electronic means.

BRIEF SUMMARY OF THE INVENTION

According to one aspect of the present invention there is provided equipment which is identified by a serial number and which has electronic circuitry incorporating a circuit module which includes a read only memory having the serial number Of the equipment stored therein.

According to a further aspect of the present invention there is provided a system comprising equipment which has electronic circuitry incorporating a circuit module which includes a read only memory having the serial number of the equipment stored therein, said circuit module further including a crypto unit having an algorithm stored therein, the crypto unit serving to generate a number from a first number entered into said crypto unit, this number being generated in accordance with the algorithm, end the system further comprising a computer for controlling operation of said equipment, said computer having software corresponding to said algorithm and which computer, upon information including said serial number being entered, generates said first number which first number, upon being entered into said crypto unit, causes said algorithm of said circuit module to generate the algorithm based number.

According to yet another aspect of the present invention there is provided a method of controlling the operation of equipment which has electronic circuitry incorporating a circuit module which includes a read only memory having the serial number of the equipment stored therein, said circuit module additionally including a crypto unit with an algorithm stored therein which crypto unit serves to generate a number, in accordance with said algorithm, each time a number recognised by the crypto unit is entered into said crypto unit, and the equipment further including means for disabling said equipment, said disabling means being connected to said module and said module including means for generating a signal for operating said disabling means so that it disables said equipment, control being exercised by means of a computer which has software corresponding to said algorithm and which computer, upon information including said serial number being entered, generates said number which number, upon being entered into said crypto unit, causes said crypto unit to generate, in accordance with said algorithm, and to store, said series of numbers, the method comprising capturing on said computer data pertaining to said equipment, said data including said serial number, using said software to generate said number, entering said number into said crypto unit so that said series of numbers is generated and stored, subsequently capturing further information on said computer, using said software to generate a number corresponding to the first number of the series stored in the crypto unit, and entering this number in said crypto unit to prevent generation of said signal which operates said disabling means.

BRIEF DESCRIPTION OF THE DRAWINGS

Embodiments of the invention will now be described, by way of example, with reference to the accompanying block diagram.

DETAILED DESCRIPTION OF THE INVENTION

Custom built integrated circuits (commonly known as "chips") are supplied to the factory at which the electronic equipment is being manufactured. Simply by way of example it will be assumed that television sets constitute the equipment. The chip has means for enabling a computer generated number to be entered and means for enabling information stored in the chip to be read. Various methods of entering information will be described below. The chip, which in essence is an intelligent switch, is built into the electronic circuitry of the set. The chip has an algorithm stored therein which is capable, on the first number of a sequence being entered, of generating the first of a unique series of numbers. Before the chip is installed, or at the time it is being installed, the serial number allocated to that set is programmed into it. The serial number can be entered in the chip using a computer and computer keyboard. The serial number is entered by first entering a code or pressing the hash or star key, then entering the serial number, then pressing the hash key or star key again or entering another code. This procedure enables the television set, so that it can be used for a preset period of time. Simultaneously the serial number is stored in the chip's ROM and cannot subsequently be changed.

The serial number can additionally if required be applied to the set in a visible manner by means of the usual plate or decal. In some instances, however, the serial number is not applied in visual form.

Because the set is enabled it can be fully factory tested for faults. After the preset period the chip switches back to a standby mode and the set can then be packed and stored.

The set is now unusable as all its electronic circuitry is disabled. As described below, only entering the first number of a unique sequence will re-enable the set so that it can be used. It is to be noted that only the serial number was inserted to activate the chip so that the set could be tested. A more complex number is thereafter required to reactivate the set.

As the sets are deactivated, and cannot be activated without inputting information only available on a controlling central computer, theft of the sets is deterred.

The party financing the sale of the television set, whether the retailer Or a financial institution such as a bank, has on its computer a software program which is compatible with the algorithm which is in the chip. At the time of sale certain information is entered in the computer. The information can vary with circumstances but generally speaking the following minimum information is required.

1. The serial number of the television set.
2. The number of months for which the sale agreement runs.
3. The day of the month by which payment must be made failing which the set will be disabled.
4. Personal details of the purchaser.
5. The warranty period in months.

On the basis of this information the software program generates a unique number which cannot be obtained except by following the procedure Just described and which number cannot be "reverse engineered".

This number is then entered in the chip which is in the set. Because the unique number has been generated using data including the serial number of the set, the unique number will only be recognised by the chip which has that serial number in it. A chip in a set with another serial number will not respond and activate the set.

The unique number entered programs the chip which now has the following information in its memory:

1. The television set's serial number.
2. The day of the month on which it must deactivate.
3. The term of the sale agreement in months.
4. The warranty period.

This information generates and stores in the chip all the necessary parameters by means of which control can be exercised in future. When the first payment of the series is made, entering details of this on the financial institution's computer generates a second number. This second number is entered in the chip and the algorithm of the chip then generates the next number of its sequence. If the number entered and the number generated match the date on which the chip will disable the set is moved forward by, say, one month. Failure to enter the requisite number by the due date, which number can only be obtained on payment details being entered in the financial institution's computer which forms part of the system, results in the set being disabled. The set remains disabled until the requisite number is entered. On the last number of the sequence being entered, which means that all payments have been made, the chip goes to a stand by mode and will not thereafter disable the set. The chip can, however, be programmed with a further set of numbers to enable the equipment to be re-leased or re-hired.

As stated, the set must be equipped with means for enabling the numbers to be entered in the chip. The simplest method is to provide the set with a keypad, preferably an alpha-numeric key pad. The purchaser is then given the number either verbally or in written form and must enter it using the keypad. An alternative method is to use a magnetic card and a card reader fitted to the set. When payment is made either to a teller or to an automatic teller machine, the next number in the sequence is stored on the card. The card is then inserted in the card reader of the set. A third possible method, usable when the set has a remote control, is to enter the number in the infra-red transmitter and then transmit the number to the infra-red receiver of the set. Another method involves providing the number in the form of a bar code, and providing the set with a bar code reader. If payment is made by debit order then the bank can be phoned, the computer accessed and the next number in the series obtained by way of a voice synthesizer driven by the computer.

If it is ever necessary to determine if the warranty period is still running, the information on the chip can be read via a port to which an interrogation unit can be connected. The information read-off the chap reveals accurately whether or not the set is still covered by a warranty. It will be understood that the warranty period commences to run from the date of sale end not from an earlier date.

A possible method of interrogation comprises entering the serial number of the equipment. If the correct serial number is entered the chip responds by generating a series of simple signals. For example, a single "bleep" can indicate that the correct serial number has been entered, two "bleeps" following the single "bleep" can indicate that there is a warranty etc. This keeps the chip as simple as possible.

If the set is sold for cash, then a reset number is generated. Once this has been entered in the chip, only the serial number and details of the warranty remain in memory.

The block diagram illustrates the features of the chip and the peripheral equipment which is required to enable the payment control system described above to be operated.

The chip is designated 10 and is conveniently in the form of a single ASIC (Application Specific Integrated circuit). It comprises two memories 12 and 14. The memory 12 is a non-volatile memory, for example, an ROM and stores the serial number in a read only form. The memory 14 is a volatile memory (the working memory) and stores information pertaining to the payment period and the warranty. It is preferably, but not necessarily, in the form of a RAM. There is an interface 16 between these memories and it is through this interface that the memories communicate, via a port 18, with a programmer 20. The programmer 20 is used to enter the serial number. At a later date the port 18 enables the information on the memories 12 and 14 to be read.

The chip 10 further includes a real time clock 22 and a controller 24. The clock 22 is required to determine the monthly intervals. It also enables the correct time to be set during programming. The signal which disables the television set is provided by the controller 24 and is fed to a cutout device 26. The controller 24 serves to control the various functions of the chip. The device 26 is built info the set but is external of the chip 10. An external crystal 28 regulates the clock 22. The oscillator which the crystal 28 drives forms part of the chip. The chip 10 is powered by an external battery 30.

The unique series of numbers is entered by means of a keypad 32, there being within the chip 10 a decoder 34 for the information which is entered by means of the keypad. The decoded information is fed to a crypto unit 36 which is itself connected to the memory 14 and the controller 24.

Finally, there is a connection 38 which enables the chip 10 to receive low voltage power from the set in which it is installed. This power is required when the chip is to be used in a programming procedure. For all other purposes the battery provides sufficient power.

The computer interface 16 is used to set up the chip. Though this, from the programmer 20 via the port 18, the real time clock is set to the correct date and time, and all other information pertaining to the purchase is entered. The initial value (as described below) of the crypto unit 36 is also set at this time. As an additional security measure the interface 16 will require a password before the initial set up can be changed at a later date.

The crypto unit is designed to generate a very long sequence, for example, sixty thousand of pseudo-random numbers based on the algorithm which is stored therein. The sequence is such that even when some of the numbers in the sequence are known it is a near impossibility to predict further numbers in the sequence. When information pertaining to the purchase is entered, the starting point in the sequence can be chosen. This again improves the security aspect as the first number generated will not be at the known point on the sequence. The sequence generated in the crypto unit will, of course, match those generated by the financial institution's computer. Each time a new number is entered the crypto unit generates a new number, compares it with the number entered and causes an appropriate controlling signal to be produced.

The controller 24, each time the host device is switched on, checks whether payment has been made for the current period. If no payment has been made and the correct code entered, then a warning is given. As soon as the cut-off date is reached the host device is disabled. The controller further monitors both the keypad decoder 34 and the crypto unit 36 for incoming codes.

Whilst a single chap 10 has been described, it is possible for there to be two chaps. The various components of the chip 10 can then be distributed between the two chips.

The set can be equipped with audible and/or visual advance warning devices which are either actuated shortly before the date on which payment must be made or, as described above, each time the set is switched on after the due date but before the cut-off date.

For domestic equipment the warning device will generally form a part of the equipment. Where the equipment is in a factory, the warning could be given at a remote control station to which all the factory's leased and hired equipment, and equipment which must be serviced, is connected.

If the chip 10 is installed in a piece of equipment such as a fax machine, then the keypad of the machine itself can be used to enter the series of computer generated numbers and it is not necessary to provide any other form of entering device.

If the system is used to ensure that installments due on a motor vehicle have been paid and the vehicle has an on-board computer, then the chip 10 can be installed in this. Those facilities which are provided to enable the vehicle computer to be programmed and interrogated can be used to program and interrogate the chip 10. It will be understood that in the case of a vehicle provision must be made for disabling the vehicle only at a time which is safe, for example, when the engine is switched-off and the vehicle is stationary. This can be achieved by sensing engine temperature and/or by sensing vehicle motion.

Many vehicles have, included in the original price, an allocation for service costs during, say, the first three years of the life of the vehicle. Information concerning this service plan, and any extension thereof which is purchased, can be stored in the chip 10. A dealer asked to perform warranty work can interrogate the vehicle itself to ascertain the warranty status, instead of checking on the main computer.

Where a piece of equipment requires a licence to operate it, then payment of the licence fee in due time can be controlled by the chip 10. For example, in almost all countries a licence must be paid annually on motor vehicles. In many countries a licence fee must be paid to a government authority before television sets and radio receivers can be used legally. Another regular payment is that due in respect of television cable converters which are used to receive pay television channels. Where a motor vehicle must be subject to an annual inspection by a governmental authority, the due date of the inspection can be entered. The due date of the inspection or any other event, whether annual, monthly or at any other interval, can be entered in the chip 10 so that a second series of unique numbers is generated. Only by paying the fee before the due date, and entering the number generated on payment of the fee, can shut-down be avoided.

The chip 10 can be constructed so that, on attempted removal thereof from the remainder of the circuit or on tampering, all data in the volatile memory 14 is lost. It only retains its serial number which is stored in the non-volatile memory 12. The chip cannot, therefore, be re-used and is no longer able to receive e number which will reactivate the equipment. This acts as a deterrent against tampering.

As a piece of equipment sold on a deferred payment plan can only run for a relatively short period of time, say one month, before shutting down, unless the appropriate number is entered, this deters theft of Such pieces of equipment.

The program in memory 14 can be written so that it will accept a disabling PIN (personal identification number). When this PIN is entered the equipment shuts down and remains shut down until a second PIN is entered which activates the equipment. By this means unauthorized use of a piece of equipment, eg after hours, can be prevented, This does not, of course, interfere with counting of the warranty period or of the date on which the next payment is due. The disabling and enabling PIN numbers can be used even when, at the end of a payment schedule, the chip has gone onto standby mode.

The presence of a programmable intelligent circuit in the electronics of a motor vehicle enables control to be exercised over the use of the vehicle. For example, a unique number can be generated by the controlling computer before a vehicle is taken into use. Only when all the required information about, for example, the driver, the destination, the time of departure etc have be captured in the computer, is the driver given the number he needs to activate the vehicle. Similar controls can be applied to vehicles which are rented out.

In another form the piece of equipment can be an access control door which is opened by means of a magnetic curd or by keying in an authorization code. The electronic circuitry of the door which responds to the card or code can include an integrated circuit which has the serial number of the door stored in the EEPROM thereof. When the door is installed, it is enabled by entering the first number generated by the access control computer of the building.

To gain access, the person must obtain a number by identifying himself and following whatever other access control procedures are required eg supplying a PIN number. The person is then given the next computer generated number in the series. When entered in the chip, using for example a key pad on the door, the number will cause the algorithm to generate the next number in the sequence. If the numbers match the door will open. The number will not open any other door. Furthermore, access can only be had in the order in which the numbers are allocated. Thus a person cannot pass through a door ahead of a person who was allocated a number before him.

Door access control can form part of a "clocking-in" system where the number is allocated when the person "clocks-in" for work.

Control over a payment schedule on a piece of equipment can be exercised as described above. The unique serial number in addition gives the supplier of the equipment the following additional facilities.

1. If the equipment is under guarantee or is covered by a service contract, and requires repair, the supplier can verify by checking the serial number that the piece of equipment brought in is in fact the one which is under guarantee or is the one covered by the service contract. The supplier can also varify that there is a paid up service contract in existence.

2. In the case of a motor vehicle which is brought to an authorized dealer in a dealer network, interrogating the chip indicates whether the guarantee is still in force, whether a service contract has been taken out on that specific vehicle or whether the work must be charged for.

I claim:

1. Equipment having electronic circuitry for operation and a circuit module connected thereto comprising a Read Only Memory means having a substantially unique equipment identification means stored therein in such a manner that said Read Only Memory means cannot be altered after said equipment is manufactured and said equipment identification means is stored therein, said equipment identification means being substantially permanently associated with said equipment; said circuit module further comprising an algorithm using said equipment identification means as data input to generate a unique first number and said equipment also comprising numeric input means for entry of a second number; said circuit module further comprising comparing means for comparing said second number entered by said numeric input means to said unique first number such that matching between said unique first number and said second number allows said electronic circuitry of said equipment to be operated and lack of matching renders said electronic circuitry of said equipment inoperable.

2. Equipment as claimed in claim 1 wherein said Read Only Memory means is an integrated circuit chip.

3. Equipment as claimed in claim 1 wherein said algorithm is also stored on said Read Only Memory means.

4. Equipment as claimed in claim 1 wherein said numeric input means is a numeric keypad.

5. Equipment as claimed in claim 1, wherein said algorithm generates a sequence of unique first numbers based on said equipment identification means, said matching between a first of said unique first numbers and an inputted first of a sequence of second numbers via said numeric input means allowing said electronic circuitry of said equipment to be operated for a predetermined time interval, and at the end of said interval said algorithm generating the next in a sequence of unique first numbers, said matching between said next in the sequence of unique first numbers and next in the sequence of second numbers allowing said equipment to operate for another predetermined time interval.

6. Equipment as claimed in claim 1 wherein said equipment identification means is a serial number.

7. Equipment as claimed in claim 1 further comprising timer means which renders said equipment inoperable if said second number is not entered into said electronic circuitry by said numeric input means prior to expiration of a predetermined time interval and a match between said second number and said unique first number occurs.

8. A system for ensuring that only authorized users be allowed to operate a piece of equipment manufactured in accordance with claim 1, further comprising a separate processing unit, provided with said equipment identification means as data input and said algorithm, such that said processing unit, using said algorithm and said equipment identification means, generates said second number to authorized users for entry into said numeric input means.

9. A system as claimed in claim 8 wherein said equipment further comprises timer means which renders said equipment inoperable unless prior to expiration of a predetermined time interval as determined by said timer means said second number is entered into said numeric input means and matches said unique first number.

10. A system as claimed in claim 8 wherein said algorithm, using said equipment identification means, generates a sequence of unique first numbers and said processing unit also using said equipment identification means as input to said algorithm, generates a sequence of matching second numbers.

11. A system as claimed in claim 10 wherein said algorithm generates said sequence of unique first numbers and said sequence of matching second numbers based on other input factors in addition to said equipment identification means.

12. A system as claimed in claim 11, wherein said other input factors comprises the number of payments for leasing said equipment.

13. A system as claimed in claim 11, wherein said other input factors comprises the contract date for first use of said equipment by a lessee.

14. A system as claimed in claim 11, wherein said other input factors comprises an identification number associated with the user of said equipment.

15. A system as claimed in claim 11, wherein said other input factors comprises the duration of each lease payment for using said equipment.

16. A system as claimed in claim 11, wherein said other input factors are selected from the group consisting of: the number of payments for leasing said equipment; the contract date for first use of said equipment by a lessee; an identification number associated with the user of said equipment; and the duration of each lease payment for using said equipment.

17. A system as claimed in claim 10 wherein each time a number in said sequence of second numbers matches said unique first number in said sequence of unique first numbers, the next number in said sequence of unique first numbers becomes said unique first number.

* * * * *